Dec. 17, 1929.   H. N. SHAW   1,739,617
INDUCTION HEATER
Filed July 30, 1928   2 Sheets-Sheet 1
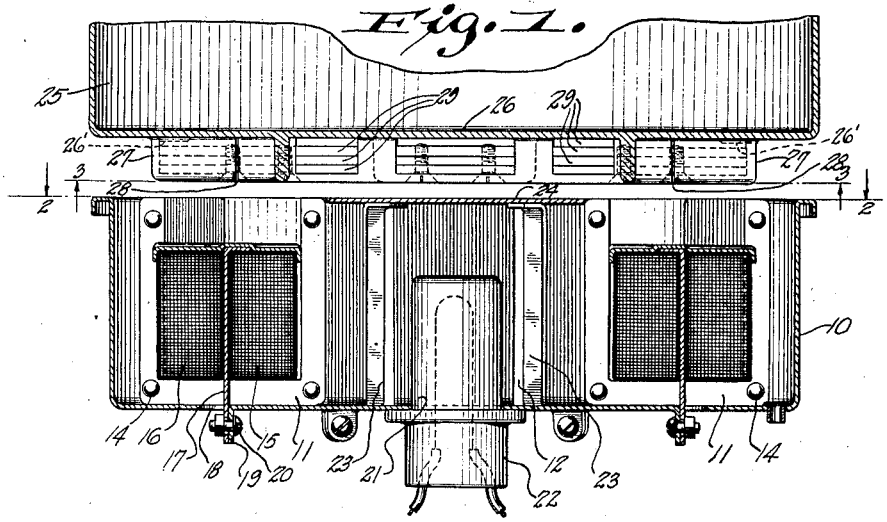
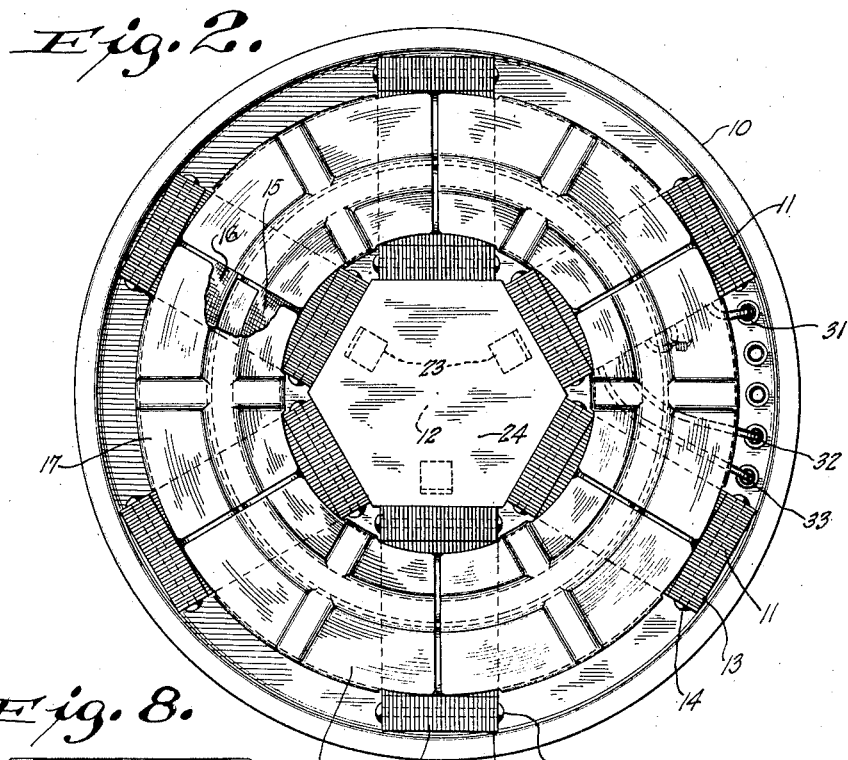
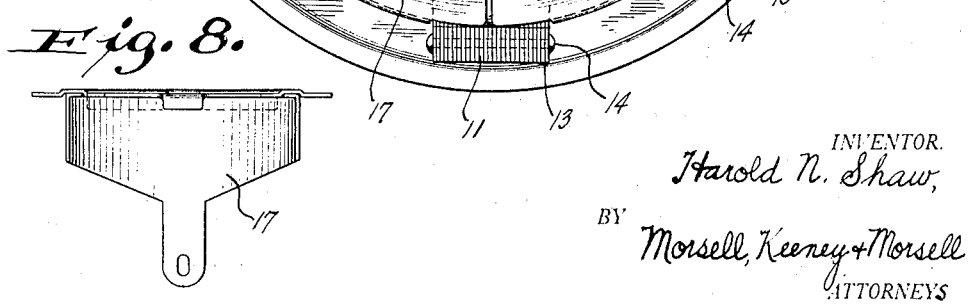
INVENTOR.
Harold N. Shaw,
BY Morsell, Keeney & Morsell
ATTORNEYS Dec. 17, 1929.  H. N. SHAW  1,739,617
INDUCTION HEATER
Filed July 30, 1928    2 Sheets-Sheet 2
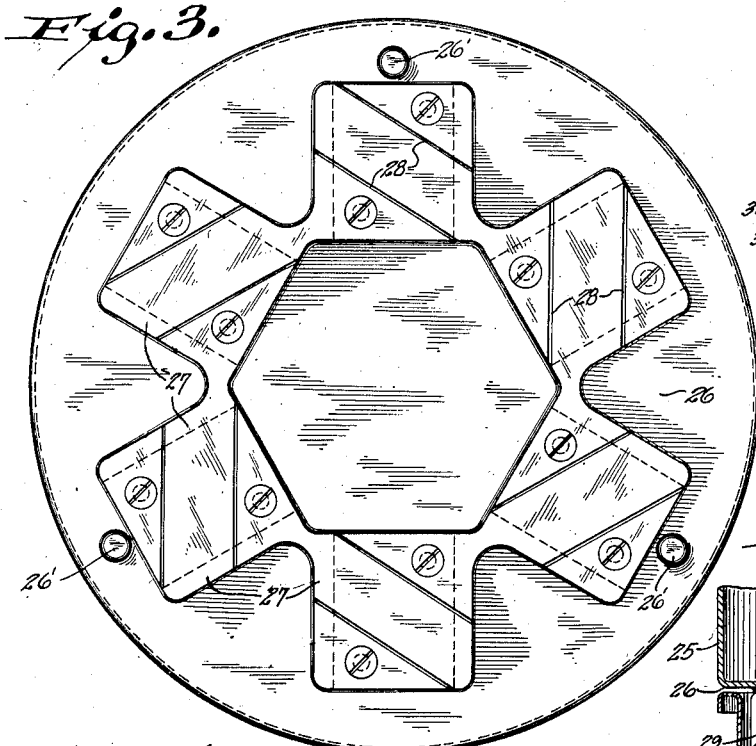
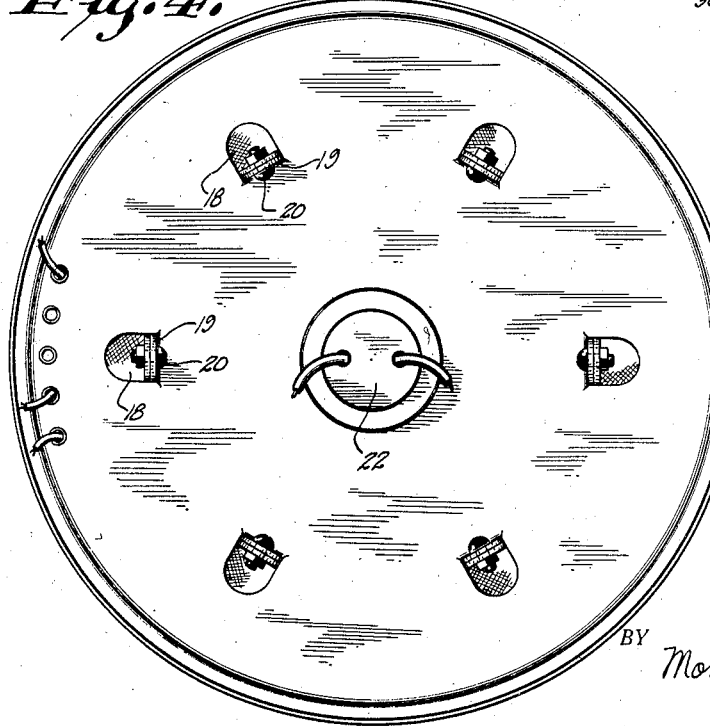
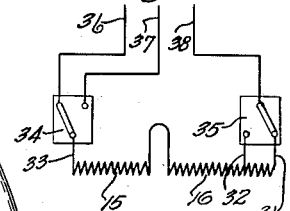
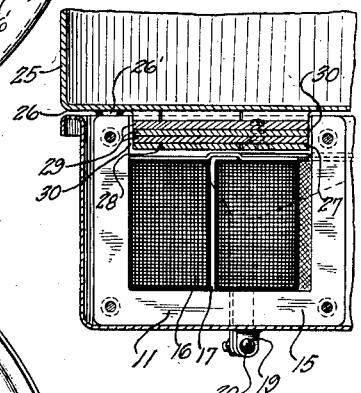
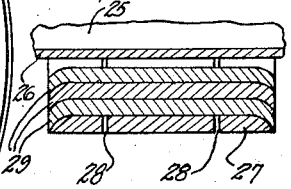
INVENTOR.
Harold N. Shaw,
BY Morsell, Keeney & Morsell
ATTORNEYS Patented Dec. 17, 1929

1,739,617

UNITED STATES PATENT OFFICE

HAROLD N. SHAW, OF MILWAUKEE, WISCONSIN

INDUCTION HEATER

Application filed July 30, 1928. Serial No. 296,235.

This invention relates to improvements in induction heaters.

It is one of the objects of this invention to provide an induction heater which is particularly adapted for use in connection with containers, in which a current is caused to flow in said container to raise the temperature thereof for cooking or other purposes.

A further object of this invention is to provide an induction heater in which a primary coil and a secondary circuit are linked by a magnetic circuit to produce heat in the secondary circuit by electrical currents induced therein.

It is a further object of this invention to provide an induction heater in which a long and well distributed secondary circuit is provided which is adapted to heat the container or other object uniformly with maximum efficiency.

It is a more specific object of this invention to provide an induction heater in which a portion of the container bottom or plate is provided with a plurality of projecting portions, each of said portions being crossed by a pair of diagonal slots, the secondary circuit travelling between said slots and in a zig-zag course from one projecting portion to another thereby producing very efficient heating.

It is a further object of this invention to provide an induction heater in which the magnetic circuit consists of U-shaped laminated members positioned around the primary coil, and straight armature members in connection with the plate or container bottom, the said armatures floating between the U-shaped members with air gaps on each side.

It is a further object of this invention to provide an induction heater in which a novel form of holding means is employed to clamp the primary coils and U-shaped members securely to the lower receptacle.

It is a further object of this invention to provide an induction heater in which the humming, ordinarily caused by vibration of the parts, is practically eliminated.

It is a further object of this invention to provide an induction heater in which the armatures and secondary circuit are in connection with the heating element and are readily separable from the U-members and coils. As the latter are quite heavy, the device would not be practical for use with domestic cooking utensils unless the container could be removed without the U-members and coils.

It is a further object of this invention to provide an induction heater, which while especially designed for use in heating a cooking utensil, may be used to heat other objects or may be utilized as a water heater in connection with a storage tank.

With the above and other objects in view, the invention consists of the improved induction heater and all its parts and combinations as set forth in the claims, and all equivalents thereof.

In the accompanying drawings, in which the same reference characters designate the same parts in all of the views:

Fig. 1 is a vertical sectional view of the device as used in connection with a container, the container being shown partly removed from the lower pan, and part of the container being broken away;

Fig. 2 is a view taken on line 2—2 of Fig. 1;

Fig. 3 is a view taken on line 3—3 of Fig. 1;

Fig. 4 is a bottom view of the lower pan;

Fig. 5 is a fragmentary sectional view taken through one of the U-members, showing the container, the armatures and the secondary circuit in operative position;

Fig. 6 is a fragmentary sectional view showing a modified form of armature construction;

Fig. 7 is a diagrammatic view of the wiring; and

Fig. 8 is a detail of one of the holding plates.

Referring to the drawing, the numeral 10 designates the lower pan within which are a plurality of U-shaped magnets 11 extending radially from an open space 12 in the center. The magnets are laminated each comprising a plurality of thin iron U-shaped members 13 secured together by rivets 14.

Wound within the magnets is an inner primary coil 15, and an outer primary coil 16. The coils and U-shaped magnets are maintained in position by curved holding plates 17, which are T-shaped in cross section. The lower ends of the holding plates project through openings 18 in the bottom of the pan and are secured to projections 19 stamped from said openings by nuts and bolts 20.

In the center of the lower pan, an opening 21 is provided, to receive a heat fuse 22. Adjacent the fuse opening, supporting brackets 23 are positioned, their lower ends being secured to the bottom of the pan, and their upper ends being bent over and secured to a plate 24.

A container 25, constructed of aluminum, or other suitable material, has its bottom portion 26 provided with downwardly extending bridges 27, which are arranged in star shaped formation as shown in Fig. 3. The bridges are also constructed preferably of aluminum to form the secondary circuit. Each of the bridges is provided with a pair of diagonally extending slots 28, between which the secondary circuit travels. This feature of the invention directs the secondary circuit in a zig-zag course from one bridge member 27 to another and between the diagonal slots 28.

Positioned within each of the bridges 27 are a plurality of iron plates 29, forming armatures for the magnetic circuit. When the upper container is positioned within the lower pan as shown in Fig. 5, the secondary bridges and the armatures 29 fit between the U-shaped magnets 11, leaving air gaps 30 on each side which complete the magnetic circuit. It is found that by bending the ends of the armature irons downwardly, as in the modified form shown in Fig. 6, the area of the air gaps, from the armature irons to the U-irons may be increased by approximately 33⅓% thereby adding to the efficiency of operation of the heater, without increasing the weight of the armature plates materially. This feature will also aid in eliminating "humming" in the operation of the device.

Lugs 26' are provided on the bottom portion 26 to provide three point support and to help prevent vibration noise.

Although the form of heater illustrated shows the secondary bridges extending from the bottom of the upper container 25, it is not desired to be limited to this particular construction. A disk or plate alone could be used with the secondary and armatures positioned as shown. A further modification which would produce efficient results comprises both an upper disk and a cylinder surrounding the U-shaped magnets, the disk carrying secondary bridges and armatures as in the principal form, and the cylinder carrying secondary bridges which surround the outer arms of the U-shaped magnets. The cylinder could be positioned within the central opening 12 as well as outside.

Fig. 7 illustrates a wiring diagram in which there are three line wires 36, 37 and 38 which carry different voltages and which are connected through the lead wires 31, 32 and 33 with the primary coils 15 and 16. By means of the switches 34 and 35 various combinations may be produced to heat the device to full, medium, or low capacity.

The operation of the device is as follows: With the primary coils connected to a source of electrical supply, an induced current is created within the secondary, by the magnetic flux which travels around the U-shaped magnets 11, across the air gaps 30, through the iron armature 29, and back around the U-members. The secondary current travels around through the bridges 27, between the slots 28, travelling in a zigzag course through and producing very efficient heating in the container bottom, plate, or cylinder, to which all heat developed in the primary coils and magnetic circuit is immediately conducted. The resistance of the secondary circuit may be varied by changing the angles of the slots 28.

Practically all of the secondary current flows through the plate between the armature members, as the path over the armature members has a high reactance, and this feature causes the heater to operate at high power factor.

From the foregoing description, it may be seen that the improved induction heater is simple in construction and very efficient in operation due, in a large measure, to the novel construction of the magnetic members and secondary bridges.

What I claim is:

1. An electrical heating device comprising a primary coil connectible with a source of electrical supply, a secondary circuit forming a heating element, and a magnetic circuit, said magnetic circuit including U-shaped members and armature members insertable between said U-shaped members, so as to leave an air gap between the ends of said armature members and the U-shaped members.

2. An electrical heating device comprising a primary coil connectible with a source of electrical supply, a magnetic circuit, and a secondary circuit forming a heating element and comprising a plurality of members adapted to conduct electricity and formed with diagonally extending slots, said members being positionable adjacent the primary coil and the magnetic circuit.

3. An electrical heating device comprising a primary coil connectible with a source of electrical supply, a magnetic circuit, a secondary circuit forming a heating element, positionable adjacent said primary coil and magnetic circuit, and means in connection with said secondary circuit for directing a current induced therein in a zig-zag course.

4. An electrical heating device comprising a primary coil connectible with a source of electrical supply, a magnetic circuit, a plate positionable adjacent said magnetic circuit, a secondary circuit forming a heating element and comprising bridge members projecting from said plate adjacent the primary coil and magnetic circuit, and armature members carried within said bridge members to complete said magnetic circuit.

5. An electrical heating device comprising a primary coil connectible with a source of electrical supply a magnetic circuit, a plate positionable adjacent said magnetic circuit, a secondary circuit forming a heating element and comprising bridge members projecting from said plate adjacent the primary coil and magnetic circuit, and armature members carried within said bridge members to complete said magnetic circuit, said bridge members being formed with diagonally extending slots for directing current induced therein in a zig-zag course.

6. An electrical heating device comprising a plurality of radially extending U-shaped magnets, a primary coil wound within said U-shaped magnets and connectible with a source of electrical supply, a plate member, a secondary circuit forming a heating element and comprising a plurality of bridge members projecting from said plate member and positionable within the U-shaped magnets so as to leave an air gap on each side, and armature plates carried within said bridge members, said bridge members each being formed with a pair of spaced apart, diagonally extending slots for directing a current induced therein in a zig-zag course.

7. In an electrical heating device a base member, a plurality of radially extending U-shaped magnets positioned on said base member, an inner primary coil wound within said U-shaped magnets, an outer primary coil wound within said magnets, and curved holding plates, T-shaped in cross section fitting above and between said coils and securing the coils and the U-shaped magnets to the base member.

8. In an electrical heating device a base member having openings therein with projections stamped from said openings, a plurality of radially extending U-shaped magnets positioned on said base member, an inner primary coil wound within said U-shaped magnets, an outer primary coil wound within said magnets, curved holding plates, T-shaped in cross section, fitting above and between said coils, the lower ends of said holding plates extending through the openings in the base member, and means for securing said lower ends to the projections stamped from the openings in the base member.

9. An electrical heating device, comprising a primary coil connectible with a source of electrical supply, a secondary circuit forming a heating element, and a magnetic circuit, said magnetic circuit including a magnet and an armature member so positioned adjacent said magnet as to leave an air gap between the sides of said armature member and the magnet.

10. An electrical heating device, comprising a primary coil connectible with a source of electrical supply, a magnetic circuit, and a secondary circuit forming a heating element and comprising a member adapted to conduct electricity, and formed with slots for directing a current induced therein in a particular course, said member being positionable adjacent the primary coil and the magnetic circuit.

11. An electrical heating device, comprising a base portion, a primary coil connectible with a source of electrical supply carried by said base portion, a magnet also carried by said base portion, and a separate heating element forming a secondary circuit and having an armature member projecting therefrom, said separate heating element being readily positionable on said base portion so that the armature member is operatively positioned adjacent the magnet and primary coil.

12. An electrical heating device, comprising a primary coil connectible with a source of electrical supply, a secondary circuit forming a heating element, and a magnetic circuit, said magnetic circuit including a U-shaped member and an armature member positioned betwen said U-shaped member, so as to leave an air gap between the sides of said armature member and the U-shaped member.

13. In an electrical heating device, a base member, a plurality of radially extending U-shaped magnets positioned on said base member, an inner primary coil wound within said U-shaped magnets, an outer primary coil wound within said magnets, and plates shaped to fit above and between said coils for securing the coils and the U-shaped magnets to the base member.

14. In an electrical heating device, a base member, a magnet, two coils wound on said magnet, and a curved holding plate, T-shaped in cross-section, fitting above and between said two coils and securing the coils and the magnet to the base member.

In testimony whereof, I affix my signature.

HAROLD N. SHAW.